(12) United States Patent
Otto et al.

(10) Patent No.: US 7,133,758 B2
(45) Date of Patent: Nov. 7, 2006

(54) NEUTRAL START INTERLOCK

(75) Inventors: Douglas R. Otto, New Holland, PA (US); Kenneth W. McLean, New Holland, PA (US); Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 110 days.

(21) Appl. No.: 10/970,578

(22) Filed: Oct. 21, 2004

(65) Prior Publication Data

US 2006/0089772 A1 Apr. 27, 2006

(51) Int. Cl.
  *F02N 17/00* (2006.01)
  *B60K 17/00* (2006.01)
(52) U.S. Cl. ............................ 701/50; 318/282; 60/328
(58) Field of Classification Search ................. 701/50; 307/9.1, 10.6, 328; 318/282; 56/10.5, 10.8; 60/328, 387, 399, 487; 92/12.2
See application file for complete search history.

(56) References Cited

U.S. PATENT DOCUMENTS

| | | | |
|---|---|---|---|
| 4,542,721 A | 9/1985 | Williams ................. 123/179 K |
| 5,188,069 A | 2/1993 | Fiorenza et al. ....... 123/146.5 B |
| 5,235,810 A * | 8/1993 | Havens ......................... 60/464 |
| 5,252,861 A | 10/1993 | Stebby et al. .............. 307/10.6 |
| 5,323,667 A | 6/1994 | Tweed et al. ............... 477/107 |
| 5,403,246 A | 4/1995 | Umemoto .................... 477/101 |
| 5,514,048 A | 5/1996 | Jacobson et al. ............. 477/99 |
| 5,586,955 A * | 12/1996 | Wanie .......................... 477/99 |
| 5,614,883 A | 3/1997 | Dery et al. .................. 340/458 |
| 5,649,606 A * | 7/1997 | Bebernes et al. ........... 180/307 |
| 6,027,426 A | 2/2000 | Holman ........................ 477/99 |
| 6,384,490 B1 | 5/2002 | Birzl et al. ................ 307/10.3 |
| 6,523,635 B1 | 2/2003 | Johnston et al. ............ 180/307 |
| 6,633,805 B1 * | 10/2003 | Burgart et al. ................ 701/51 |
| 6,955,046 B1 * | 10/2005 | Holder et al. ................. 60/487 |
| 2002/0112688 A1 | 8/2002 | Fariz et al. .............. 123/179.2 |

\* cited by examiner

*Primary Examiner*—Dalena Tran
(74) *Attorney, Agent, or Firm*—Stephen A. Bucchianeri; John William Stader; Michael C. Harms (57) ABSTRACT

A neutral start interlock for a hydrostatic drive system that uses potentiometers to electronically monitor at least the position of the hydrostatic displacement control such that the engine will not start unless such control is in the neutral position.

5 Claims, 6 Drawing Sheets

NEUTRAL START INTERLOCK

BACKGROUND OF THE INVENTION

The present invention relates generally to hydrostatically driven agricultural windrowers, and more particularly to a neutral start interlock that utilizes potentiometers to electronically monitor the position of the hydrostatic displacement control on such systems.

Hydrostatic drive systems are often configured with the pump attached directly to the engine without a clutch or other mechanisms to stop rotation of the pump while the engine is running. The vehicle is then subject to movement based on the pump displacement control which most commonly is moved selectively through forward-neutral-reverse positions by the operator. Currently, vehicles equipped with this type of drive system utilize a mechanical latch to trap the displacement control in neutral for starting. The latch also activates a switch or series of switches to complete the electrical starting circuit. Most of these systems include several moving parts and require complicated adjustment to maintain functionality.

It would be a distinct advantage to have a neutral start interlock for such hydrostatic drive systems that requires no mechanical adjustment and does not require a mechanical latch to be effective.

SUMMARY OF THE INVENTION

Accordingly, it is an object of the present invention is to provide a neutral start interlock for a hydrostatic drive system that does not require a mechanical latch to be effective.

Another object of the present invention is to provide a neutral start interlock for a hydrostatic drive system that requires no mechanical adjustments.

It is another object of the present invention to provide a neutral start interlock for a hydrostatic drive system that employs software to interpret output from several potentiometers to determine if the required components are in a neutral position.

Yet another object of the present invention is to provide a neutral start interlock for a hydrostatic drive system that uses potentiometers to electronically monitor the position of the hydrostatic displacement control.

It is yet another object of this invention to provide a neutral start interlock for a hydrostatic drive system that is durable in construction, inexpensive of manufacture, carefree of maintenance, facile in assemblage, and simple and effective in use.

These and other objects are attained by providing a neutral start interlock for a hydrostatic drive system that uses potentiometers to electronically monitor at least the position of the hydrostatic displacement control such that the engine will not start unless such control is in the neutral position.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
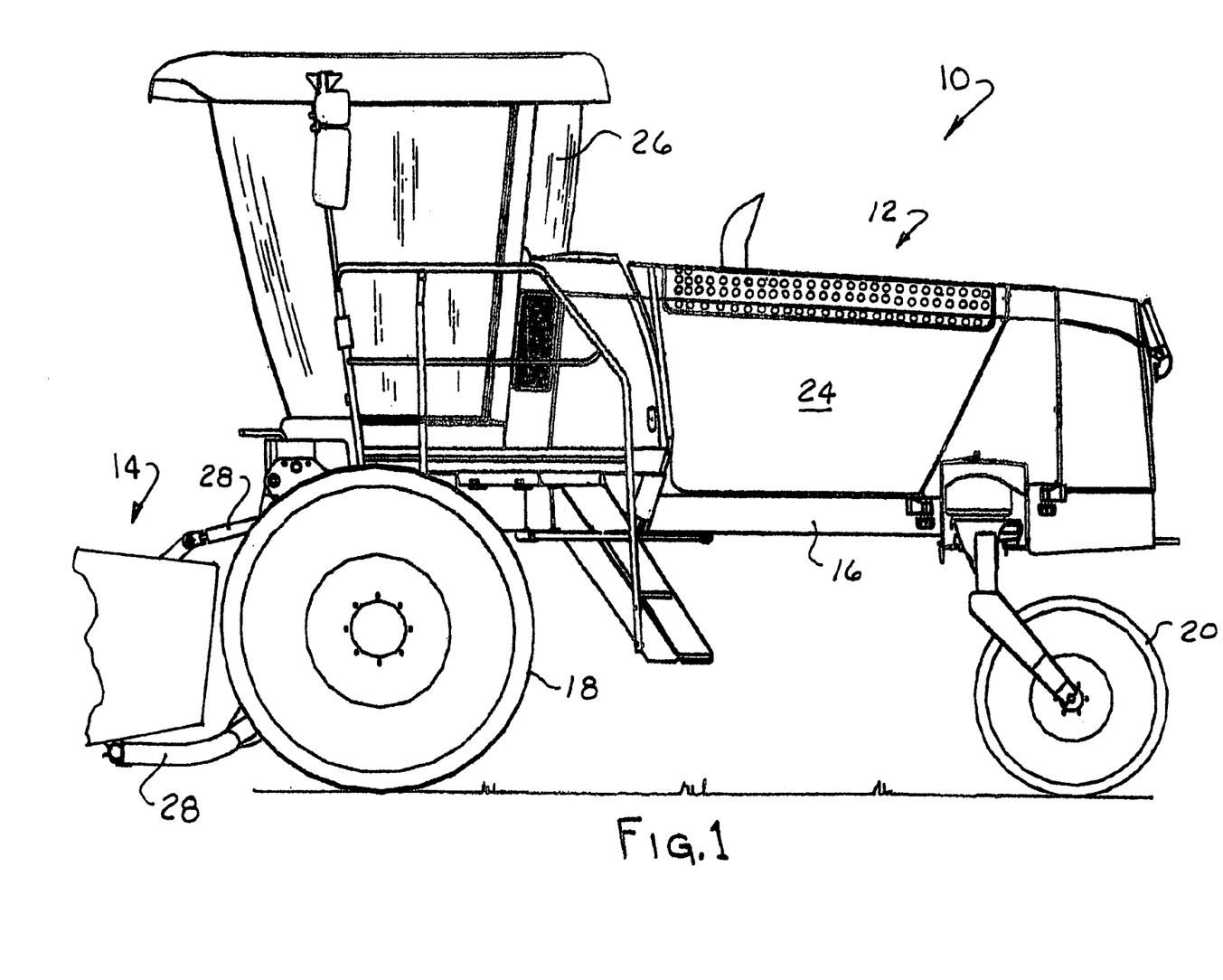
FIG. 1 is a side plan view of a windrower, with header, of the type herein under discussion.

FIG. 1 shows the two primary components of a self-propelled windrower 10, i.e., tractor 12 and header 14. Tractor 12 has a main frame 16, with a longitudinal horizontal axis from front to back, that is supported by a pair of drive wheels 18 (only one shown) on the forward portion thereof and a pair of rear wheels 20 adjacent the rear end. An engine, located under cowling 24, a transmission and other components, all well known in the art, are supported on the main frame 16 and provide the power necessary for the machine to operate. A cab 26, also supported on the main frame, encloses the operator's platform to provide an environmentally controlled location from which the windrower may be comfortably operated.

Header 14 may be of several designs, but typically comprises a cutting mechanism, either a sicklebar or rotary cutter, a feeder mechanism and conditioning rolls. The header is supported by a hydraulic lift and flotation structure 28 that may be activated to selectively raise or lower the header between transport and operational positions.

The general mode of operation of a modem windrower is to have tandem hydrostatic pumps, one for each of two drive wheels, each pump having a depending pintle arm such that forward and reverse movement of the pintle arm relative to a neutral position causes the associated hydrostatic pump, and thus the associated drive wheel, to rotate. During the original assembly of the windrower and during normal maintenance and repair operations in the life of the machine, the pintle arms must be adjusted to neutral.

Figure 2:
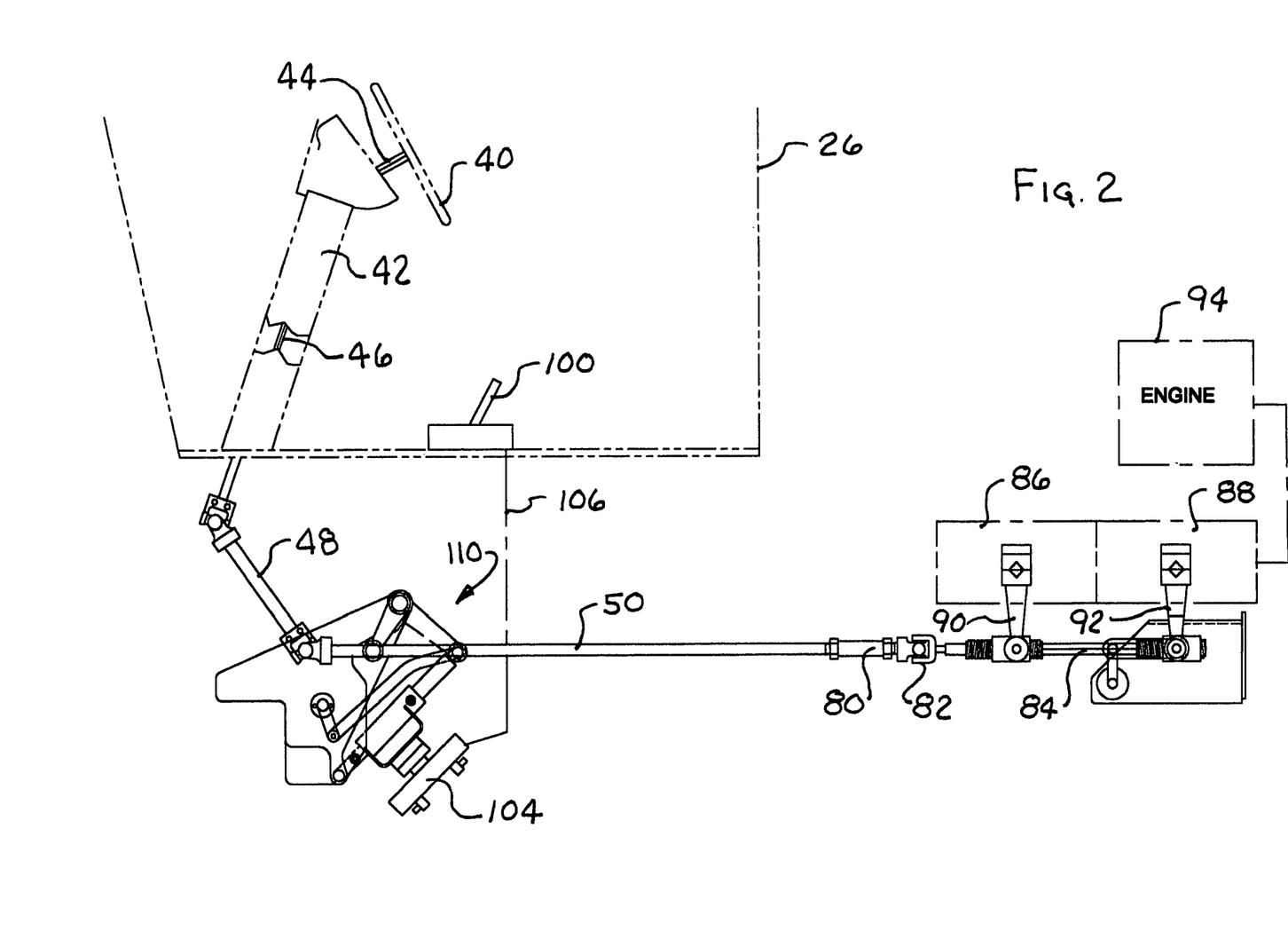
FIG. 2 is a partial left side view of the hydrostatic control system of the windrower, with some components of neutral start interlock of the instant invention.

Referring now to FIG. 2, the hydrostatic control system is shown to further include a conventional steering wheel 40 and console 42 inside the operator's cab 26. The cab would, of course, include additional components (not shown) such as a seat, electrical and mechanical controls for operation of the windrower, an air conditioning unit, and the like. The steering wheel is attached to a stub shaft 44 that is connected to the upper end of front shaft 46 by a universal connector (not shown). The universal connector is well known in the art as a mechanism to transmit rotational movement between two shafts that are not necessarily in axial alignment. The lower end of front shaft 46 is connected to elongate bottom shaft 50 by another universal connector, or power-take-off shaft, 48. A length adjustment assembly 80 is attached to the rear most end of bottom shaft 50.

Length adjustment assembly 80 is connected, by another universal connector 82, to elongate threaded rod-like member 84 one end with right-hand threads and the other with left-hand threads—, such that any turn of steering wheel 40 results in a proportional turn of member 84. Two tandem hydraulic pumps 86, 88 are located above member 84 and each has a pintle arm 90, 92, respectively, depending therefrom. Each pintle arm has an internally threaded block threaded onto member 84, such that rotation of the rod causes the pintle arm to move either forwardly or rearwardly, depending upon the direction of rotation of member 84. Thus, rotation of member 84 results in one pintle arm rotating in a clockwise direction and the other rotating in a counter-clockwise direction, when viewed from the side, as in FIG. 2. This causes one pump to increase flow and the other to decrease flow, turning the windrower. Engine 94 supplies power to the hydraulic pumps.

Within cab 26 is a forward-neutral-reverse lever 100. This is continuously and selectively movable to allow a change in speed in either the forward or reverse directions. The neutral position has either an indent or other mechanism to allow easy recognition by the operator. Lever 100 is intended to selectively move member 84 forwardly or rearwardly to simultaneously move both pintle arms an equal amount, thus allowing an equal increase or decrease in flow from the hydraulic pumps. In this embodiment, lever 100 is electrically connected (shown graphically as line 106) to linear motor 104 which, as will be discussed further below, moves bottom shaft 50 and member 84 through the action of the forward-neutral-reverse shift control mechanism 110 forwardly or rearwardly under the control of the operator.

Figure 3:
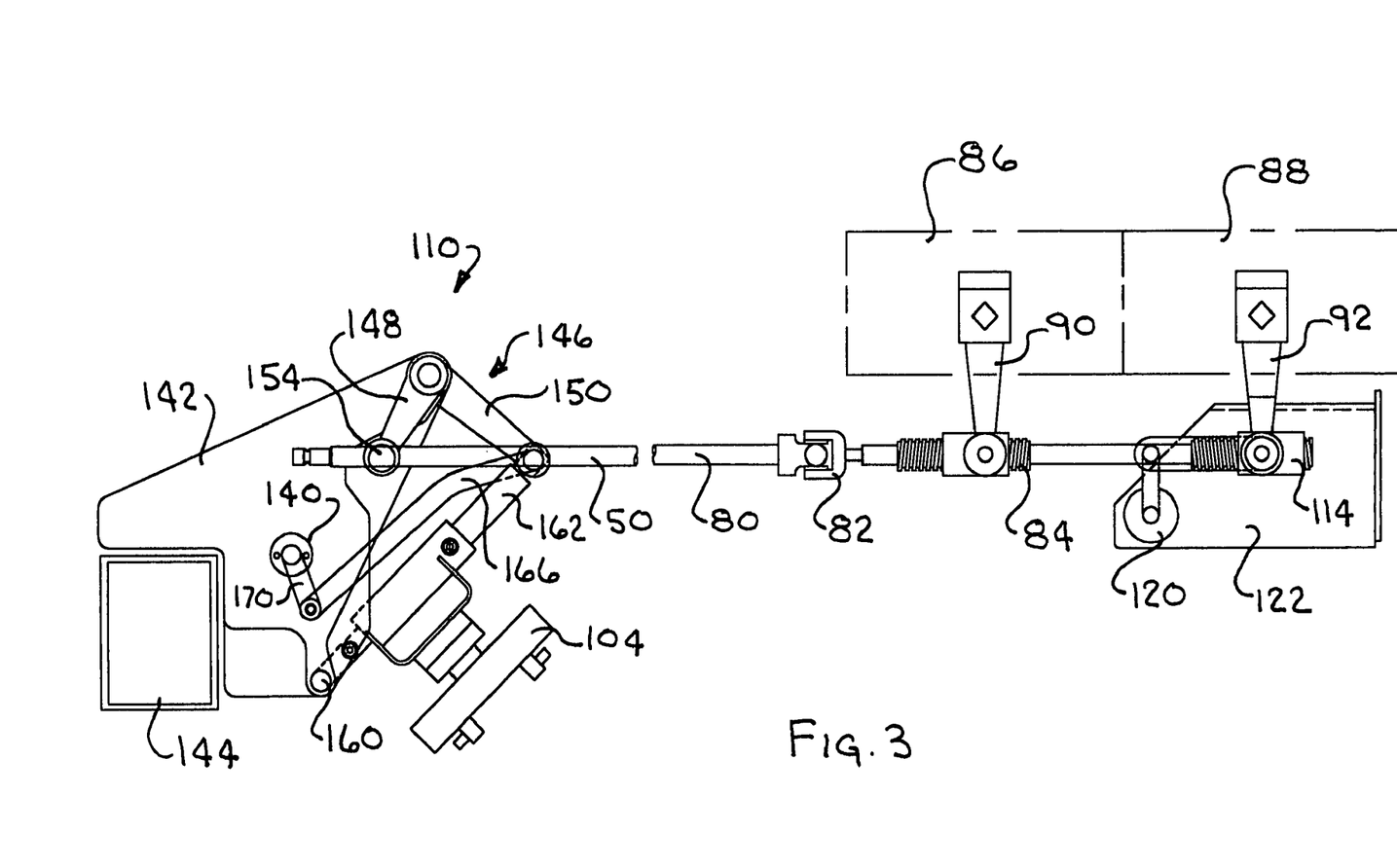
FIG. 3 is an enlargement of the mechanisms for engaging the potentiometers of the instant invention.
Figure 4:
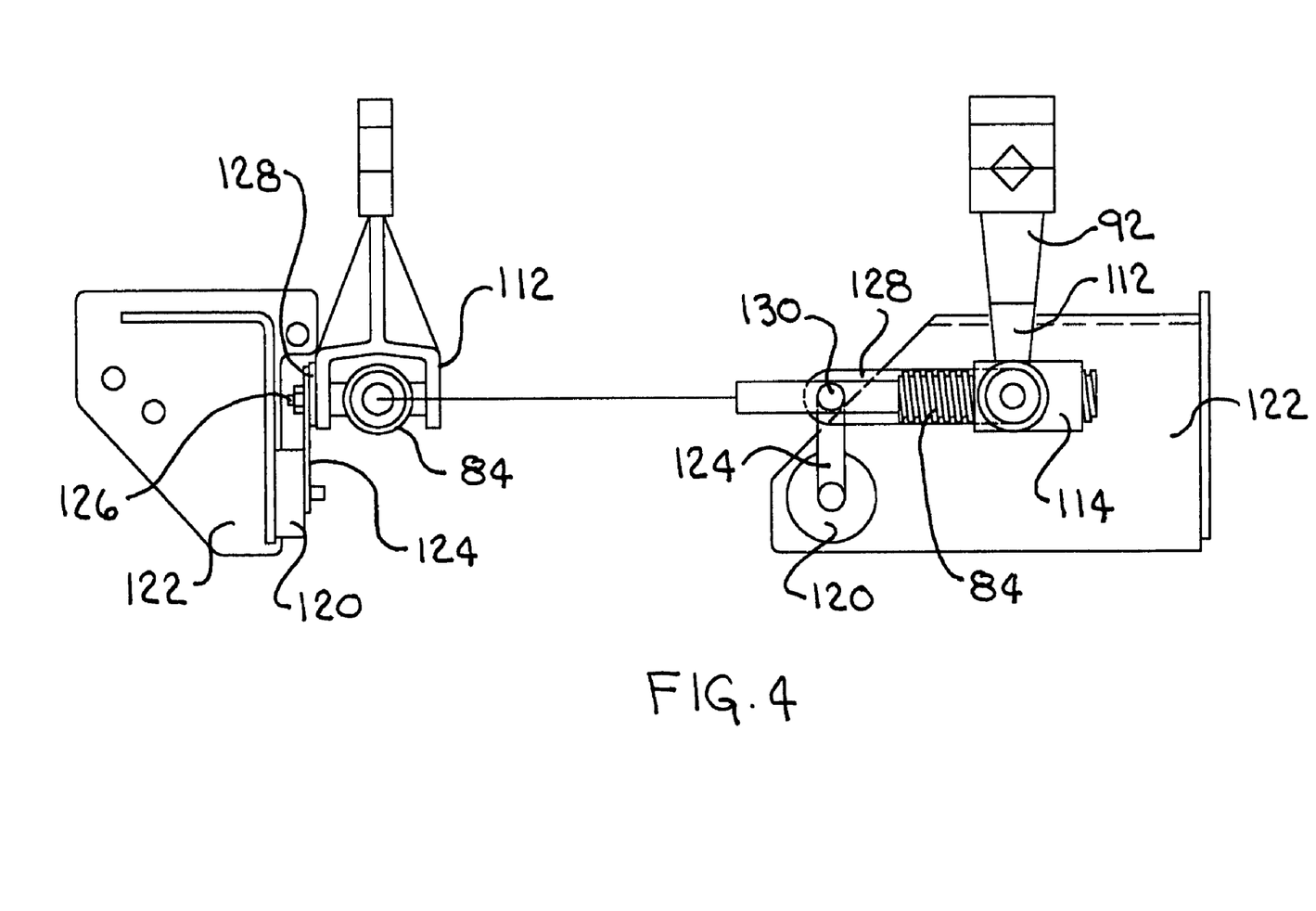
FIG. 4 is a partial side and end view of the pintle arm and the structure used to engage the pintle arm potentiometer.

FIGS. 3 and 4 show that the lower end of each pintle arm terminates in a yoke. In this embodiment, arm 92 terminates in yoke 112 that is pivotably attached to internally threaded block 114 via a pair of horizontally aligned pivot pins on either side of block 114. Block 114 is, in turn, threaded onto member 84. Thus, rotation of member 84 causes block 114 and yoke 112 to move, pivoting the pintle arm 92.

A first potentiometer 120 is affixed to a mounting bracket 122 attached to a structural member or substantial component, such as the engine 94, to provide a steady fixed relationship between the potentiometer and the member 84. A bolt 126 attaches a small horizontally and forwardly extending plate 128 to yoke 112. Adjacent the forward end of plate 128 potentiometer arm 124 is rotatably attached. Thus, as pintle arm 92 moves because of engagement of lever 100 or rotation of member 84, the potentiometer arm 124 rotates, changing the voltage value generated through potentiometer 120.

While a single potentiometer associated with a single pintle arm is shown, it is possible to use two potentiometers, one with each pintle arm. This would allow a more positive determination of the neutral status of both pintle arms, but is not as efficient and cost effective as a single arrangement, because it is not likely that, once initially adjusted, the two will significantly change their relationship.

Figure 5:
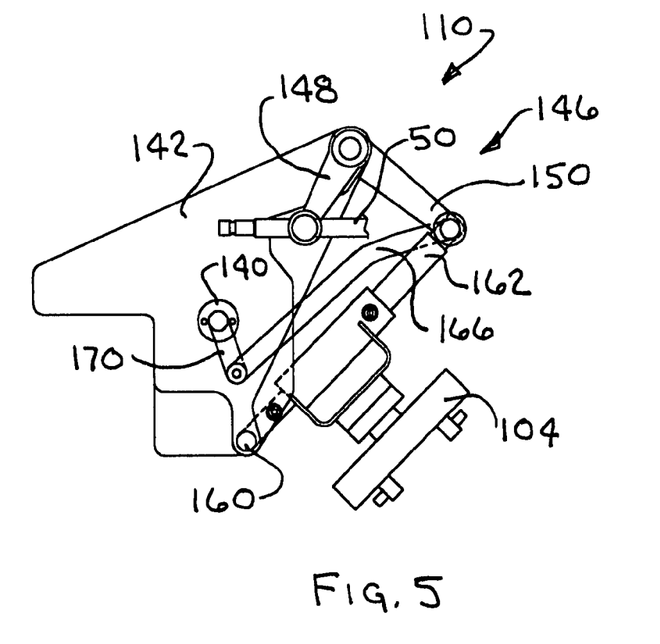
FIGS. 5 and 6 are similar side views of part of the forward-neutral-reverse shift control mechanism 110.
Figure 6:
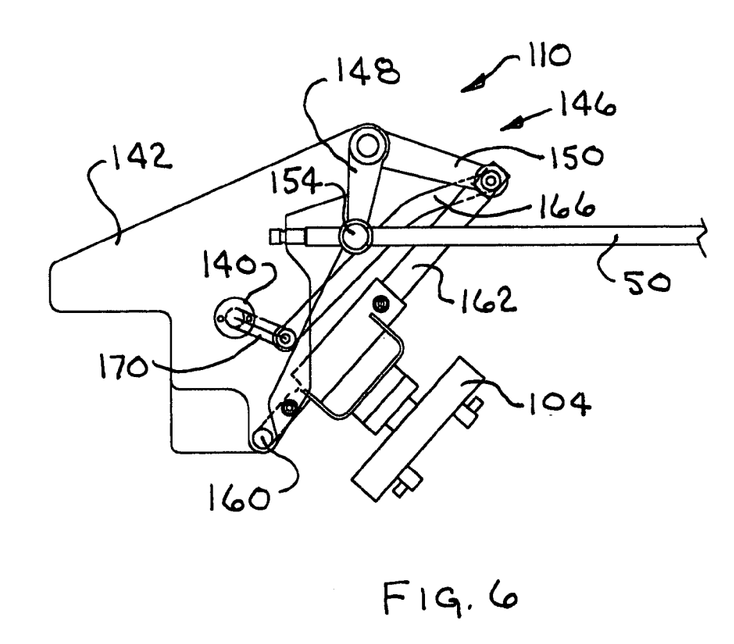

A second potentiometer 140 is affixed to a mounting bracket 142 attached, similarly to bracket 122, to a structural member or substantial component, such as main frame member 144. A substantially L-shaped arm 146, having legs 148 and 150, is pivotably affixed to bracket 142 at pivot point 152 and fixed in relation to each other. Bottom shaft 50 is connected to arm 148 by a pivotable connector 154 such that as arm 148 rotates about pivot point 152, connector 154 maintains a grip on bottom shaft 50 and allows relative pivoting between shaft 50 and arm 148.

The linear motor 104 is pivotably attached to bracket 142 at pivot point 160 and is set up to extend and contract arm 162 as prompted by the operator through lever 100. Arm 162 is pivotably affixed to the end of leg 150 of L-shaped arm 146, so that extension of arm 162 by motor 104 pivots the L-shaped arm counterclockwise, and contraction of arm 162 pivots the L-shaped arm clockwise. Another arm, 166 is pivotably affixed at one end to the end of leg 150 of L-shaped arm 146, and pivotably attached at the opposing end to potentiometer arm 170. Thus, when lever 100 is moved by the operator, motor 104 extends or contracts arm 162 in response thereto, pivoting the L-shaped arm 146 and moving bottom shaft 50 forwardly or rearwardly. At the same time that arm 146 is rotated, arm 166 rotates potentiometer arm 170, changing the voltage value through potentiometer 140.

Figure 7:
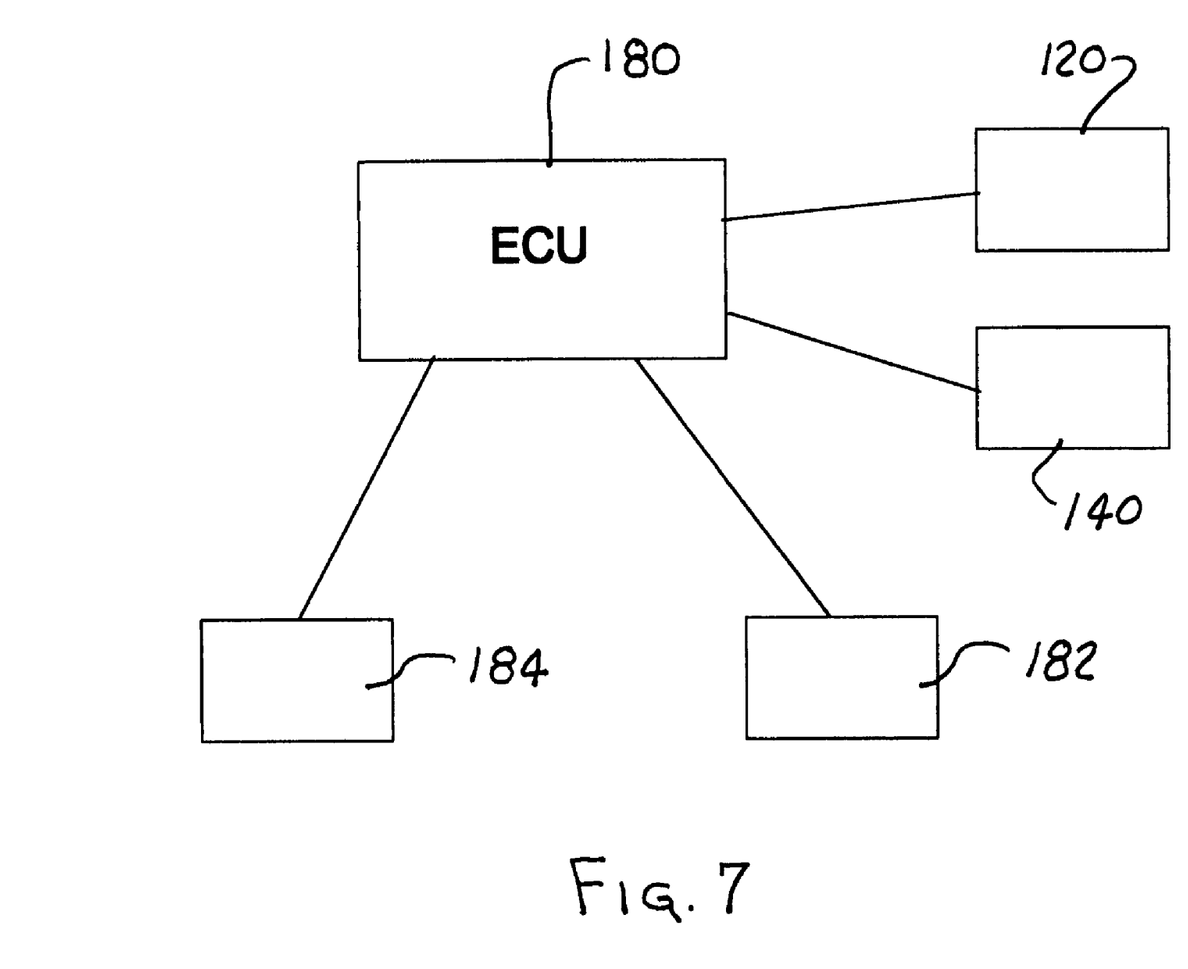
FIG. 7 is a schematic of the electrical control and feedback circuitry of the neutral start interlock of the instant invention.

FIG. 7 is a graphic representation of the neutral start system, and shows potentiometers 120 and 140, mounted as shown in FIG. 2, ECU (electronic control unit) 180, starter 182 and starter switch 184. The ECU can take several forms, such as, for example, a programmable processor. The basic function of the neutral start interlock is accomplished broadly by linking potentiometer 120 to the pintle arms of the hydrostatic pumps and potentiometer 140 of the forward-neutral-reverse shift control mechanism 110 and establishing a neutral voltage for each. The neutral voltage values are fed to the memory of an ECU. When the engine starting procedure is initiated by a starter switch 184 for instance, the software in the ECU compares the stored values with the current values. The ECU software either accepts the values and allows the engine to be started by starter 182, or it rejects the values and directs instructions to an in-cab display to put the potentiometers to reach neutral, such as, for example, "turn steering wheel to the right", or the like. The terms "accepts" and "rejects" as used herein means that a comparison is made of the current voltage values are compared with stored values and if there is a difference, the starter circuit is disabled. Since there is always some tolerance in mechanical structures and mechanisms, the voltage value that permits the starter circuit to be energized is usually within at least a small range of values. Generally, however, the difference in voltage values is understood to be zero.

It is also possible to measure only the voltage difference at either the pintle arms or the forward-neutral-reverse shift control. Obviously, monitoring only one of these two components is not as effective or complete as measuring both, and thus is not the preferred embodiment.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural windrower with a longitudinal axis extending between front and opposing rear ends, front and rear wheel pairs supporting a main frame, an operator's platform supported on said main frame generally adjacent said front end of the windrower, an engine and hydrostatic drive system supported by said main frame to supply motive power to said front wheel pair, said drive system including first and second hydrostatic pumps, one for driving each wheel of said front wheel pair, each said pump having a depending pintle arm selectively and continuously pivotable between forward, neutral and reverse positions, said pintle arms in generally the same vertical plane, said main frame adapted to support a removable crop-engaging header on said front end thereof, a steering wheel supported on said operator's platform and rotatable in first and second opposing directions, said steering wheel having a neutral alignment wherein said steering wheel is generally in parallel alignment with said longitudinal axis, a first rotational motion transfer mechanism having first and second opposing ends, said first end of said first motion transfer mechanism connected to said steering wheel such that rotation of said steering wheel causes a generally equal amount of rotation of said second end of said first motion transfer mechanism, a second motion transfer mechanism connect to said pintle arms such that rotation of said second motion transfer mechanism in said first direction pivots said pintle arms apart, and rotation in said second direction rotates said pintle arms together; whereby said pintles may be located in said neutral position when said steering wheel is in said neutral alignment, the improvement comprising:

a neutral start interlock comprising:
  a first potentiometer supported on said main frame and connected to one of said pintle arms and located to generate a voltage value dependent upon the position of said one pintle arm;
said first potentiometer electronically connected to an electronic control unit including a visual display unit and an electronic memory containing a first stored voltage value representing said neutral position of said on pintle arm, said electronic control unit further including software to compare a first present voltage value from said first potentiometer with said first stored voltage value and selectively generate a message to said visual display depending upon the difference between said first stored voltage value and said first present voltage value;
a starter circuit for said engine;
said starter circuit electronically connected to said electronic control unit; and
said software in said electronic control unit adapted to disable said starter circuit if the difference between said first stored voltage value and said first present voltage value is other than a first predetermined amount;
a forward-neutral-reverse shift control mechanism on said operator's platform and connected to said first motion transfer mechanism to selectively adjust the speed and direction of travel of the windrower by selectively moving said pintle arms in unison among forward, neutral and reverse positions;
a second potentiometer supported on said main frame and connected to said shift control mechanism and located to generate a voltage value dependent upon the position of said shifting mechanism;
said second potentiometer electronically connected to said electronic control unit, said electronic memory also containing a second stored voltage value representing said neutral position of said shifting mechanism, said software adapted to compare a second present voltage value from said second potentiometer with said second stored voltage value and selectively generate a message to said visual display depending upon the difference between said second stored voltage value and said second present voltage value; and
said software in said electronic control unit adapted to disable said starter circuit if the difference between said second stored voltage value and said second present voltage value is other than a second predetermined amount.

2. In an agricultural windrower with a longitudinal axis extending between front and opposing rear ends, front and rear wheel pairs supporting a main frame, an operator's platform supposed on said main frame generally adjacent said front end of the windrower, an engine and hydrostatic drive system supported by said main frame to supply motive power to said front wheel pair, said drive system including first and second hydrostatic pump, one for driving each wheel of said front wheel pair, each said pump having a depending pintle arm selectively and continuously pivotable between forward, neutral and reverse positions, said pintle arms in generally the same vertical plane, said main frame adapted to support a removable crop-engaging header on said front end thereof, a steering wheel supported on said operator's platform and rotatable in first and second opposing directions, said steering wheel having a neutral alignment wherein said steering wheel is generally in parallel alignment with said longitudinal axis, a first rotational motion transfer mechanism having first and second opposing ends, said first end of said first motion transfer mechanism connected to said steering wheel such that rotation of said steering wheel causes a generally equal amount of rotation of said second end of said first motion transfer mechanism a second motion transfer mechanism connect to said pintle arms such that rotation of said second motion transfer mechanism in said first direction pivots said pintle arms apart and rotation in said second direction rotates said pintle arms together; whereby said pintles may be located in said neutral position when said steering wheel is in said neutral alignment, the improvement comprising:

a neutral start interlock comprising:
  a first potentiometer supported on said main frame and connected to one or said pintle arms and located to generate a voltage value dependent upon the position of said one pintle arm;
said first potentiometer electronically connected to an electronic control unit including a visual display unit and an electronic memory containing a first stored voltage value representing said neutral position of said one pintle arm, said electronic control unit further including software to compare a first present voltage value from said first potentiometer with said first stored voltage value and selectively generate a message to said visual display depending upon the difference between said first stored voltage value and said first present voltage value;
a starter circuit for said engine;
said starter circuit electronically connected to said electronic control unit; and
said software in said electronic control unit adapted to disable said starter circuit if the difference between said first stored voltage value and said first present voltage value is other than a first predetermined amount;
a forward-neutral-reverse shift control mechanism on said operator's platform and connected to said first motion transfer mechanism to selectively adjust the speed and direction of travel of the windrower by selectively moving said pintle arms in unison among forward, neutral and reverse positions;

a second potentiometer supported on said main frame and connected to said shift control mechanism and located to generate a voltage value dependent upon the position of said shifting mechanism;

said second potentiometer electronically connected to said electronic control unit, said electronic memory also containing a second stored voltage value representing said neutral position of said shifting mechanism, said software adapted to compare a second present voltage value from said second potentiometer with said second stored voltage value and selectively generate a message to said visual display depending upon the difference between said second stored voltage value and said second present voltage value; and said software in said electronic control unit adapted to disable said starter circuit if the difference between said second stored voltage value and said second present voltage value is other than a second predetermined amount.

3. The improvement of claim 2, wherein:

said first and second predetermined amounts are substantially zero.

4. A vehicle having a longitudinal axis extending between front and opposing rear ends, at least two drive wheels supporting a main frame, an operator's platform supported on said main frame generally adjacent said front end of the vehicle, an engine and hydrostatic drive system supported by said main frame to supply motive power to said drive wheels, said drive system including first and second hydrostatic pumps, one for driving each wheel of said at least two drive wheels, each said pump having a depending pintle arm selectively and continuously pivotable between forward, neutral and reverse positions, said pintle arms in generally the same vertical plane, a steering wheel supported on said operator's platform and rotatable in first and second opposing directions, said steering wheel having a neutral alignment wherein said steering wheel is generally in parallel alignment with said longitudinal axis, a first rotational motion transfer mechanism having first and second opposing ends, said first end of said first motion transfer mechanism connected to said steering wheel such that rotation of said steering wheel causes a generally equal amount of rotation of said second end of said first motion transfer mechanism, a second motion transfer mechanism connect to said pintle arms such that rotation of said second motion transfer mechanism in said first direction pivots said pintle arms apart and rotation in said second direction rotates said pintle arms together;

a neutral start interlock including a first potentiometer supported on said main frame and connected to one of said pintle arms and located to generate a voltage value dependent upon the position of said one pintle arm;

said first potentiometer electronically connected to an electronic control unit including a visual display unit and an electronic memory containing a first stored voltage value representing said neutral position of said one pintle arm, said electronic control unit further including software to compare a first present voltage value from said first potentiometer with said first stored voltage value and selectively generate a message to said visual display depending upon the difference between said first stored voltage value and said first present voltage value;

and starter circuit for said engine;

said starter circuit electronically connected to said electronic control unit; and said software in said electronic control unit adapted to disable said starter circuit if the difference between said first stored voltage value and said first present voltage value is outside a first predetermined range;

a forward-neutral-reverse shift control mechanism on said operator's platform and connected to said first motion transfer mechanism to selectively adjust the speed and direction of travel of the windrower by selectively moving said pintle arms in unison among forward, neutral and reverse positions;

a second potentiometer supported on said main frame and connected to said shift control mechanism and located to generate a voltage value dependent upon the position of said shifting mechanism;

said second potentiometer electronically connected to said electronic control unit, said electronic memory also containing a second stored voltage value representing said neutral position of said shifting mechanism, said software adapted to compare a second present voltage value from said second potentiometer with said second stored voltage value and selectively generate a message to said visual display depending upon the difference between said second stored voltage value and said second present voltage value; and said software in said electronic control unit adapted to disable said starter circuit if the difference between said second stored voltage value and said second present voltage value is outside a second predetermined range.

5. The vehicle of claim 4, wherein:

said first and second predetermined ranges include zero.

* * * * *